United States Patent
Tanaka et al.

(10) Patent No.: US 6,921,308 B2
(45) Date of Patent: Jul. 26, 2005

(54) ENGINE AND PERSONAL WATERCRAFT (75) Inventors: Yoshinobu Tanaka, Hyogo (JP);
Masaaki Miyoshi, Kobe (JP);
Yoshimoto Matsuda, Kobe (JP);
Atsufumi Ozaki, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/723,013

(22) Filed: Nov. 26, 2003

(65) Prior Publication Data
US 2004/0132357 A1 Jul. 8, 2004

(30) Foreign Application Priority Data
Nov. 27, 2002 (JP) ........................................ 2002-343418

(51) Int. Cl.[7] .............................................. B63H 21/32
(52) U.S. Cl. ................................................... 440/89 F
(58) Field of Search ............................ 440/89 F, 89 G, 440/89 E (56) References Cited

U.S. PATENT DOCUMENTS

| | | | | |
|---|---|---|---|---|
| 4,071,445 A | * | 1/1978 | Katayama et al. | 210/655 |
| 5,846,102 A | * | 12/1998 | Nitta et al. | 440/1 |
| 5,934,959 A | * | 8/1999 | Inman et al. | 440/89 R |

* cited by examiner

Primary Examiner—Stephen Avila
(74) Attorney, Agent, or Firm—Alleman Hall McCoy Russell & Tuttle LLP (57) ABSTRACT

A personal watercraft and engine therefor are provided. The engine typically is mounted in a personal watercraft and configured to discharge an exhaust gas through a water muffler. The engine typically includes a cylinder head forming a combustion chamber, wherein the cylinder head is provided with an exhaust port configured to draw the exhaust gas from the combustion chamber to the water muffler, and an air passage configured to allow the exhaust port and an outside of the engine to communicate with each other, and the air passage is provided with a valve configured to restrict a flow of air within the air passage.

15 Claims, 6 Drawing Sheets

ENGINE AND PERSONAL WATERCRAFT

BACKGROUND OF THE INVENTION

1. Field of the Invention

The present invention relates to an engine mounted in a personal watercraft and configured to discharge an exhaust gas through a water muffler, and the personal watercraft configured to drive a propulsion mechanism thereof by the engine.

2. Description of the Related Art

In recent years, jet-propulsion personal watercraft have been widely used in leisure, sport, rescue activities, and the like. A typical personal watercraft includes an engine mounted in a space surrounded by a hull and a deck. The personal watercraft is configured to have a water jet pump that pressurizes and accelerates water sucked from a water intake generally provided on a bottom surface of the hull and ejects it rearward from an outlet port. Thereby, the personal watercraft is propelled.

The personal watercraft includes an exhaust system configured to discharge an exhaust gas from the engine outside the watercraft. Typically, the exhaust system includes a water muffler that serves to muffle a noise of the exhaust gas. The water muffler is provided at a location in a flow passage of the exhaust gas ranging from an exhaust port of the engine to an exhaust outlet provided in a body of the watercraft. In the case of the exhaust system including the water muffler, some cooling water is supplied to the exhaust gas from the engine and vaporized into a steam by heat of the exhaust gas. The energy of the exhaust gas containing the steam is reduced while the exhaust gas is flowing within the water muffler and the noise thereof is muffled.

In general, an exit of the exhaust system leading outside the watercraft is provided under a waterline of the watercraft. The exhaust gas is discharged into water, thereby allowing the noise of the exhaust gas to be further reduced.

When the watercraft finishes cruising and its engine is in a stopped state, some water droplets reside on an inner wall of the exhaust port through which a combustion chamber of the engine communicates with an outside of the engine. Possible causes of this problem are described below.

First, the exhaust gas flowing within the exhaust port during an operation of the engine has a negative pressure intermittently due to pulsation of the exhaust gas, and under this negative-pressure condition, the exhaust gas containing the steam within the water muffler flows back toward the exhaust port.

Second, the steam is filled in the exhaust system after the engine stops. Specifically, in the case of the watercraft in which a four-cycle engine is mounted, under the condition in which an exhaust valve is closed while the engine is in a stopped state, an inner space of the exhaust system ranging from the exhaust valve to the exhaust outlet submerged in water is closed. And, immediately after the engine stops, the water supplied to an inside of the exhaust system remains as the steam. The steam is filled within the exhaust system, and condenses on the inner wall of the exhaust port.

Third, when the engine is in the stopped state, the steam within the exhaust system flows back toward an exhaust passage due to movement of a piston within a cylinder. Specifically, in the case of the four-cycle engine, when the engine stops while any of the cylinders is under a condition of compression stroke, a compressed gas within the combustion chamber sometimes causes the piston to be slightly pushed back toward a bottom dead center. Therefore, when the engine stops with the exhaust valve opened, and the piston moves toward the bottom dead center as described above, the steam remaining within the exhaust system flows back toward the exhaust port.

Due to one or a plurality of the above described causes, the steam might condense on the inner wall of the exhaust passage. Undesirably, the water droplets on the inner wall of the exhaust port might cause rust. In particular, it is undesirable that the steam condenses on a portion of the exhaust port which is near the combustion chamber, whose temperature tends to become relatively high, and on the exhaust valve.

SUMMARY OF THE INVENTION

The present invention addresses the above described conditions, and an object of the present invention is to provide an engine capable of inhibiting a steam in an exhaust gas from condensing on an inner wall of an exhaust port of the engine, and a personal watercraft configured to drive a propulsion mechanism of the watercraft by the engine.

According to one aspect of the present invention, there is provided an engine mounted in a watercraft and configured to discharge an exhaust gas through a water muffler, comprising a cylinder head forming a combustion chamber, wherein the cylinder head is provided with an exhaust port configured to draw the exhaust gas from the combustion chamber to the water muffler, and an air passage configured to allow the exhaust port and an outside of the engine to communicate with each other, and the air passage is provided with a valve configured to restrict a flow of air flowing within the air passage.

With the above construction, since ambient air is introduced into the exhaust port of the cylinder head through the air passage, it is possible to inhibit the steam generated within the exhaust system including the water muffler located downstream in a flow passage of the exhaust gas from flowing back toward the exhaust port. As a result, it is possible to inhibit the steam from condensing to form droplets on the inner wall of the exhaust port.

The valve may be configured to permit the flow of air from the outside of the engine toward the exhaust port when a pressure within the exhaust port is lower than a pressure outside the engine, and may be configured not to permit the flow of the air from the exhaust port toward the outside of the engine when the pressure within the exhaust port is higher than the pressure of the outside of the engine. In such a configuration, when the exhaust port has a negative pressure due to pulsation of the exhaust gas, or due to movement of the piston after the engine stops, the ambient air is introduced into the exhaust port. Thereby, the steam generated within the exhaust system can be inhibited from flowing back toward the exhaust port.

The valve may be configured to permit the flow of the air within the air passage when the engine is in a stopping or stopped state. For example, the engine may further comprise a sensor configured to detect an engine speed of the engine, wherein the valve may be an electromagnetic valve configured to be driven based on a detection signal from the sensor. Based on the detection signal from the sensor, it can be judged whether or not the engine is in the stopping or stopped state. Then, based on this judgment, the electromagnetic valve can be opened after the engine stops. Since the ambient air is introduced into the exhaust port through the air passage or the steam remaining within the exhaust system can be discharged through the air passage after the engine stops, the steam is inhibited from condensing to form droplets on the inner wall of the exhaust port. As the sensor, a crank position sensor configured to detect the number of rotations of a crankshaft may be used.

The air passage may be configured to be connected to the exhaust port in the vicinity of an end of the exhaust port on the combustion chamber side. In such a configuration, the steam is inhibited from condensing to form droplets on a portion of the exhaust port in the vicinity of the combustion chamber or on the exhaust valve. Also, while the engine is operating, the negative pressure tends to be generated due to pulsation of the exhaust gas at a location of the exhaust port which is closer to the combustion chamber. So, by connecting the air passage to this location of the exhaust port, the ambient air is reliably introduced utilizing the negative pressure.

The cylinder head, the exhaust port, and the air passage may be associated with one of a plurality of cylinders of the engine; the air passage may be divided into a plurality of sub-passages; each of the plurality of cylinders may include the exhaust port; and the air passage may be configured to fluidically connect each exhaust port to the outside of the engine, through the corresponding sub-passage. In such a construction, the steam is inhibited from condensing to form droplets on the inner wall of the exhaust port of each cylinder.

The sub-passages may be merged at a location thereof into a merged portion of the air passage, and the valve may be provided so as to be closer to the outside of the engine than to the location where the sub-passages are merged. In such a construction, it is not necessary to provide the valve in each of the sub-passages. By merging all the sub-passages, one valve is sufficient. This leads to a reduced cost.

According to another aspect of the present invention, there is provided a personal watercraft comprising an engine mounted within a body of the watercraft, and a water muffler equipped within the body and configured to be connected to the engine to allow an exhaust gas from the engine to flow within the water muffler, wherein the engine includes a cylinder head forming a combustion chamber, the cylinder head is provided with an exhaust port configured to draw an exhaust gas from the combustion chamber to an outside of the cylinder head, and an air passage configured to allow the exhaust port and the outside of the engine to communicate with each other, and the air passage is provided with a valve configured to restrict a flow of air within the air passage.

With the above construction, the personal watercraft equipped with the exhaust system including the water muffler can have the engine capable of inhibiting the steam in the exhaust gas from condensing to form droplets on the inner wall of the exhaust port.

The personal watercraft may further comprise a sensor configured to detect an engine speed of the engine, and a control device configured to receive a detection signal from the sensor and configured to, based on the received signal, transmit a signal indicative of whether or not the engine is in the stopping or stopped state, to the valve, wherein the valve may be an electromagnetic valve configured to be driven based on the signal from the control device. In this case, a crank position sensor may be used to detect an engine speed of the engine, and based on the detection result, the control device judges whether or not the engine is in the stopping or stopped state. When judging that the engine is in the stopping or stopped state, the control device transmits a predetermined signal to the electromagnetic valve to cause the electromagnetic valve to open. Thereby, after the engine stops, the air passage opens, so that the steam is inhibited from condensing to form droplets on the inner wall of the exhaust port.

The above and further objects and features of the invention will more fully be apparent from the following detailed description with accompanying drawings.

DETAILED DESCRIPTION OF THE PREFERRED EMBODIMENTS

Figure 1:
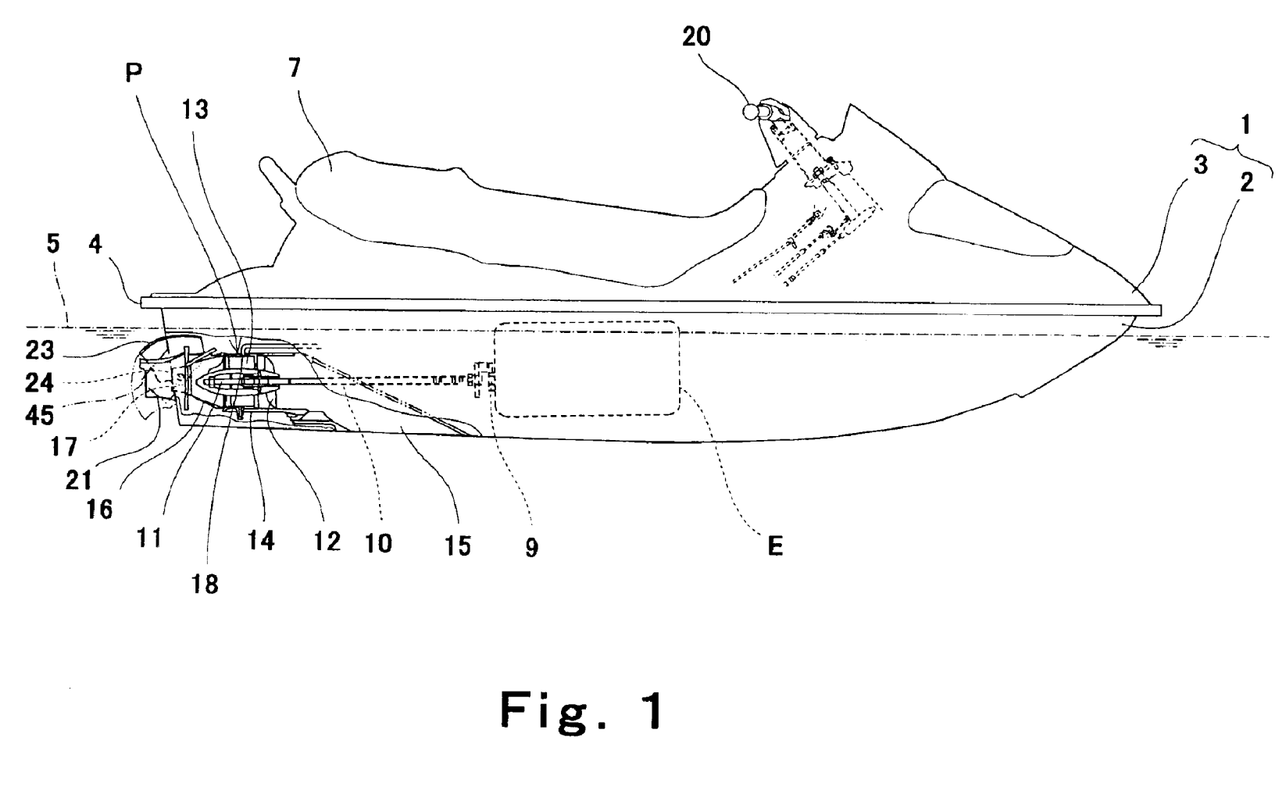
FIG. 1 is a side view of a personal watercraft according to an embodiment of the present invention.

Hereinafter, embodiments of a personal watercraft of the present invention will be described with reference to the accompanying drawings. The personal watercraft in FIG. 1 is a straddle-type personal watercraft provided with a seat 7 straddled by a rider. A body 1 of the watercraft comprises a hull 2 and a deck 3 covering the hull 2 from above. A line at which the hull 2 and the deck 3 are connected over the entire perimeter thereof is called a gunnel line 4. A waterline 5 of the watercraft is located below the gunnel line 4 when the watercraft is at rest on water.

Figure 2:
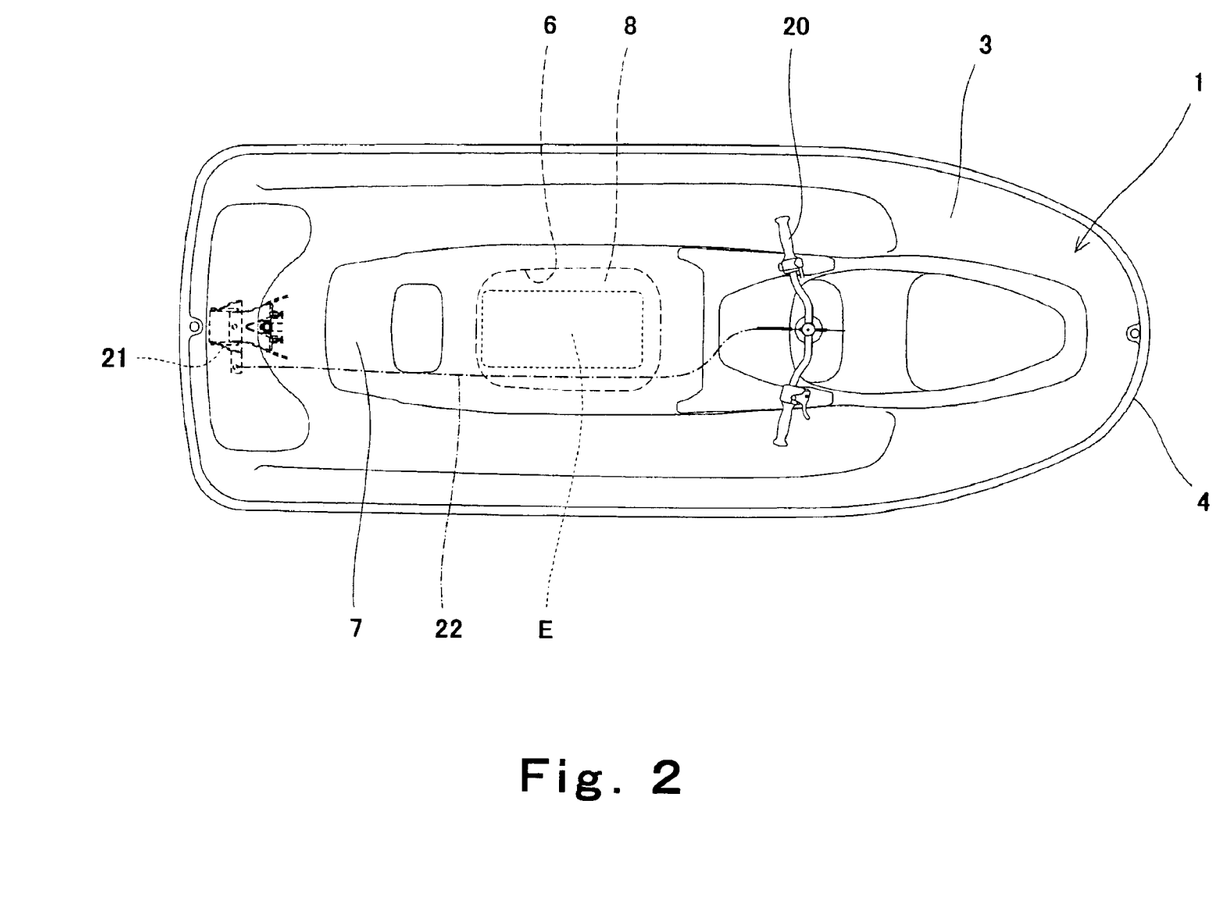
FIG. 2 is a plan view of the personal watercraft in FIG. 1.

As shown in FIG. 2, an opening 6, which has a substantially rectangular shape as seen from above, is formed at a substantially center section of the deck 3 in the upper portion of the body 1 such that its longitudinal direction corresponds with the longitudinal direction of the body 1. The seat 7 is removably mounted over the opening 6.

An engine room 8 is provided in a space defined by the hull 2 and the deck 3 below the opening 6. An engine E is mounted within the engine room 8 and configured to drive the watercraft. The engine room 8 has a convex-shaped transverse cross-section and is configured such that its upper portion is smaller than its lower portion. In this embodiment, the engine E is an in-line four-cylinder four-cycle engine. As shown in FIG. 1, the engine E is mounted such that a crankshaft 9 extends along the longitudinal direction of the body 1.

An output end of the crankshaft 9 is rotatably coupled integrally with a pump shaft 11 of a water jet pump P provided on the rear side of the body 1 through a propeller shaft 10. An impeller 12 is attached on the pump shaft 11 of the water jet pump P. Fairing vanes 13 are provided behind the impeller 12. The impeller 12 is covered with a pump casing 14 on the outer periphery thereof.

A water intake 15 is provided on the bottom of the body 1. The water intake 15 is connected to the pump casing 14 through a water passage. The pump casing 14 is connected to a pump nozzle 16 provided on the rear side of the body 1. The pump nozzle 16 has a cross-sectional area that gradually reduces rearward, and an outlet port 17 is provided on the rear end of the pump nozzle 16.

The water outside the watercraft is sucked from the water intake 15 and fed to the water jet pump P. The water jet pump P pressurizes and accelerates the water and the fairing vanes 13 guide water flow behind the impeller 12. The water is ejected through the pump nozzle 16 and from the outlet port 17 and, as the resulting reaction, the watercraft obtains a propulsion force.

The engine E according to this embodiment uses an open-looped cooling system. As shown in FIG. 1, a water-drawing hole 18 is provided at a predetermined location in an upper portion of the pump casing 14. Some of the water being pressurized by the water jet pump P is drawn into the watercraft for use as cooling water through the water-drawing hole 18 and supplied to a cooling system equipped in the watercraft to cool the engine E or the like.

A bar-type steering handle 20 is provided at a front portion of the deck 3. The steering handle 20 is connected to a steering nozzle 21 provided behind the pump nozzle 16 through a cable 22 in FIG. 2. When the rider rotates the handle 20 clockwise or counterclockwise, the steering nozzle 21 is swung toward the opposite direction so that the ejection direction of the water being ejected through the pump nozzle 16 can be changed, and the watercraft can be correspondingly turned to any desired direction while the water jet pump P is generating the propulsion force.

As shown in FIG. 1, a bowl-shaped reverse deflector 23 is provided on the rear side of the body 1 and on the upper side of the steering nozzle 21. The deflector 23 is supported by a horizontally provided swinging shaft 24 of the watercraft such that it can vertically swing around the swinging shaft 24. The deflector 23 is swung downward to a lower position around the swinging shaft 24 to deflect the ejected water from the steering nozzle 21 forward and, as the resulting reaction, the personal watercraft moves rearward.

Figure 3:
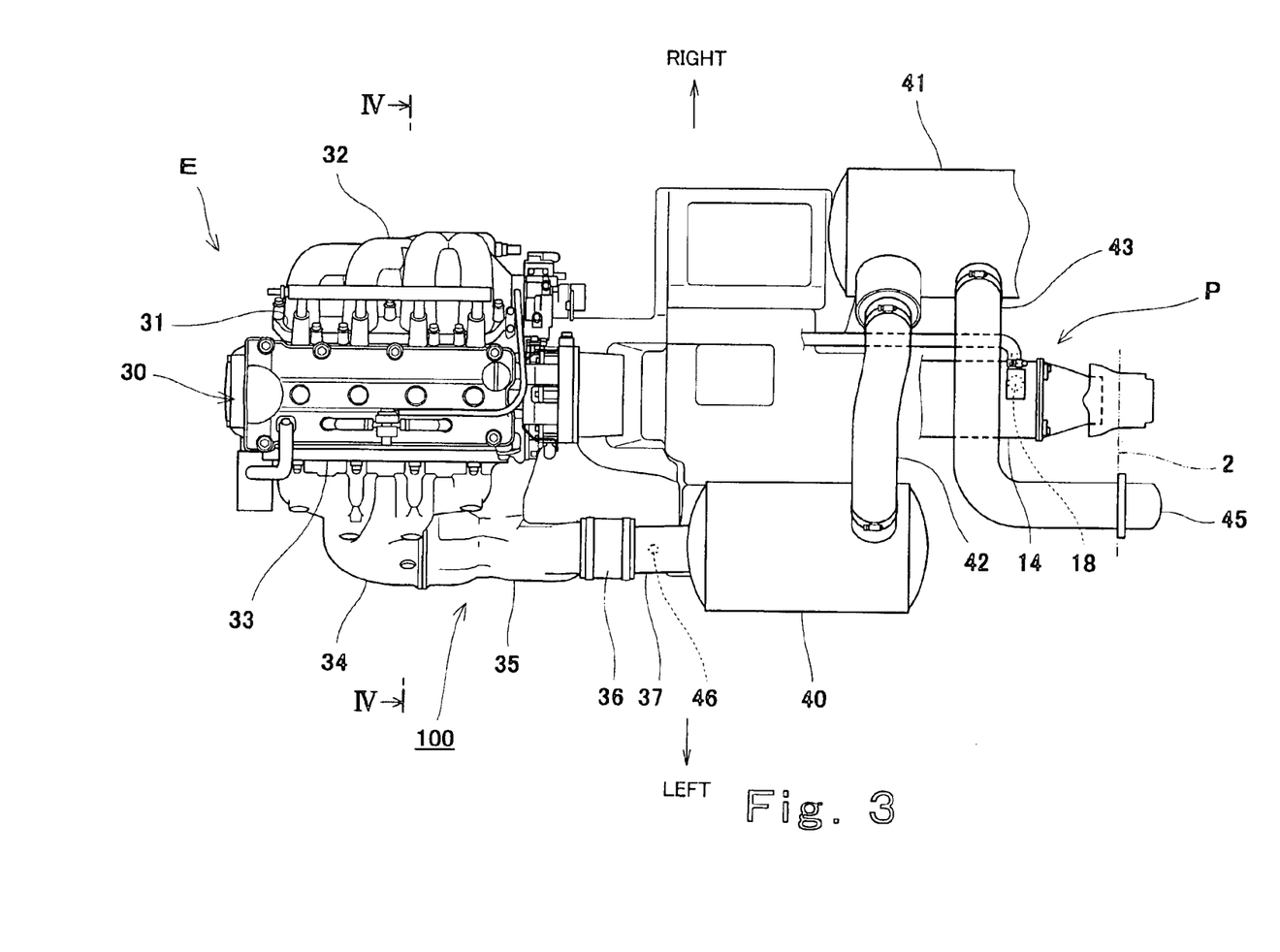
FIG. 3 is a plan view showing a construction of an engine and an exhaust system mounted in the personal watercraft in FIG. 1.

As shown in FIG. 3, in a construction of the engine E and an exhaust system 100 of the personal watercraft, the engine E is placed forward of the pump casing 14. An end portion of each of a plurality of passages of air-intake manifold 32 is connected to a corresponding one of a plurality of air-intake inlet (entrance of the air-intake ports 60 mentioned later: see FIG. 4) 31 provided on the right side of a cylinder head 30 of the engine E, and each of a plurality of end portions of passages of exhaust manifold 34 is connected to a corresponding one of a plurality of exhaust outlets (exits of exhaust ports 61 mentioned later: see FIG. 4) 33 provided on the left side of the cylinder head 30.

An upstream muffler 40 is provided on the left side of the pump casing 14. The exhaust manifold 34 is connected to the upstream muffler 40 through a first exhaust pipe 35, a rubber pipe 36, and a second exhaust pipe 37 in successive order. A downstream muffler 41 is provided on the right side of the pump casing 14 so as to be located rearward with respect to the upstream muffler 40. The upstream muffler 40 and the downstream muffler 41 communicate with each other through a first connecting pipe 42 provided over the pump casing 14. One end portion of a second connecting pipe 43 is connected to the downstream muffler 41 and the other end portion thereof penetrates the hull 2 and forms an exhaust outlet 45 of the exhaust system 100. The exhaust outlet 45 is located under the waterline 5 of the watercraft (see FIG. 1). Thus, the exhaust system 100 forms a flow passage of an exhaust gas ranging from the exhaust manifold 34 to the exhaust outlet 45.

The first exhaust pipe 35 has a double-walled structure provided with a water jacket (not shown) within which the cooling water flows. A water-supply hole 46 is provided on a wall portion of the second exhaust pipe 37 to allow some of the cooling water being drawn through the water-drawing hole 18 to be supplied to the second exhaust pipe 37. The water supplied from the water-supply hole 46 to the second exhaust pipe 37 makes contact with a high-temperature exhaust gas being discharged from the engine E, and thereby is vaporized into a steam, which flows within the upstream muffler 40 and the downstream muffler 41. The upstream muffler 40 and the downstream muffler 41 are water mufflers, where the energy of the exhaust gas is reduced and thereby the noise of the exhaust gas is reduced.

(Embodiment 1)

Figure 4:
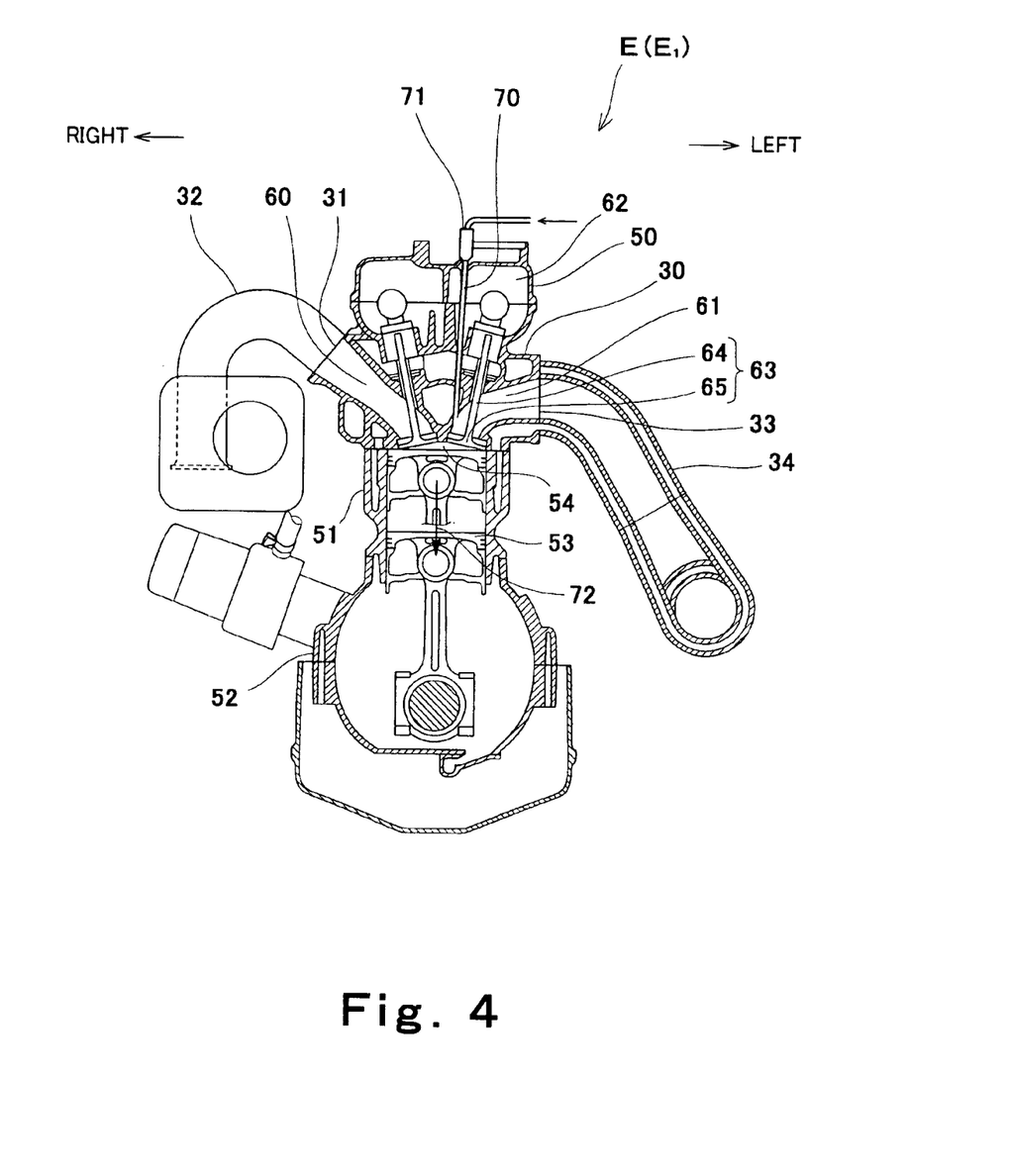
FIG. 4 is a cross-sectional view of the engine in FIG. 3, taken along line IV—IV.

As shown in FIG. 4, which is a cross-sectional view of the engine E in FIG. 3, taken along line IV—IV, the engine E ($E_1$) is configured such that an upper portion of the cylinder head 30 is covered with a cylinder head cover 50 from above, and a cylinder block 51 and a crankcase 52 are provided in successive order below the cylinder head 50. A piston 53 is provided within the cylinder block 51 and configured to reciprocate. A space defined by an upper end face of the piston 53, the cylinder block 51, and the cylinder head 30 form a combustion chamber 54.

The air-intake ports 60 and the exhaust ports 61 are formed in the cylinder head 30. The air-intake ports 60 are configured to allow an outside of the cylinder head 30 to communicate with the combustion chamber 54 and the exhaust ports 61 are configured to allow the outside of the cylinder head 30 to communicate with the combustion chamber 54. The air-intake ports 60 and the exhaust ports 61 are provided so as to correspond to four cylinders included in the engine $E_1$. In such a construction, air drawn into the combustion chamber 54 through an air-intake system including the air-intake manifold 32 and the air-intake ports 60 is combusted therein and, thereafter, is discharged outside the watercraft through the exhaust system 100 (see FIG. 3) including the exhaust ports 61, the upstream muffler 40, and the downstream muffler 41.

A space defined by the cylinder head 30 and the cylinder head cover 50 form a cam chamber 62. Exhaust valves 63 are each provided between the cam chamber 62 and a vicinity of an upstream end of the corresponding exhaust port 61 so as to penetrate the cylinder head 30. The exhaust valves 63 are each comprised of a stick-shaped valve stem 64 and a valve portion (mushroom) 65 provided at a lower end of the valve stem 64. The valve portion 65 is located at an upstream opening end of the exhaust port 61. The exhaust valve 63 is operated in cooperation with rotation of the crankshaft 9 (see FIG. 1), thereby causing the upstream opening of the exhaust port 61 to open and close.

The cylinder head 30 and the cylinder head cover 50 are provided with air passages 70 configured to penetrate the head 30 and the cover 50. One end of each of the air passages 70 are each connected to a vicinity of an end of the corresponding exhaust port 61 on the combustion chamber 54 side, and are each configured to open toward an inside of the corresponding exhaust port 61. The other ends of each of the air passages 70 extend through an upper portion of the cylinder head cover 50 and are configured to open outside the engine $E_1$. Therefore, the air passages 70 are each configured to fluidically connect the corresponding exhaust port 61 to the outside of the engine E. One-way valves 71 are each provided at a location of the corresponding air passage 70 to regulate a flow of the air within the corresponding air passage 70. The one-way valves 71 are each mechanically driven to open and close based on a pressure difference between one end portion and the other end portion of the corresponding air passage 70 in such a manner that, when a pressure within the exhaust port 61 is lower than a pressure outside the engine $E_1$, the valve 71 opens while, when the pressure within the exhaust port 61 is higher than the pressure of outside the engine $E_1$, the valve 71 closes. That is, the one-way valve 71 permits only the flow of the air from the outside the engine $E_1$ to the exhaust port 61. The air passage 70 and the one-way valve 71 are provided in the same configuration in each of the exhaust ports 61, provided respectively so as to correspond to the four cylinders included in the engine $E_1$.

An operation of the engine $E_1$ constructed as described above will be described. While the engine $E_1$ is operating, the exhaust valve 63 operates, thereby causing the upstream opening of the exhaust port 61 to open and close, so that density of the exhaust gas (or exhaust pressure) varies with a lapse of time. When the exhaust pressure within the exhaust port 61 is lower, ambient air is introduced into the exhaust port 61 through the air passage 70 and the one-way valve 71. As a result, it is possible to inhibit the exhaust gas containing the steam from flowing back from a downstream side of the exhaust system 100 toward the exhaust port 61.

When the engine $E_1$ stops with the exhaust valve 63 opening in any one of the four cylinders, and the piston 53 moves toward the bottom dead center (see an arrow 72 in FIG. 4), the pressure within the exhaust port 61 becomes lower. Under this condition, also, the ambient air is introduced into the exhaust port 61 through the air passage 70. Therefore, when the pressure within the exhaust port 61 becomes lower with downward movement of the piston 53, it is possible to inhibit the steam from flowing from the downstream side of the exhaust system 100 toward the exhaust port 61.

(Embodiment 2)

Figure 5:
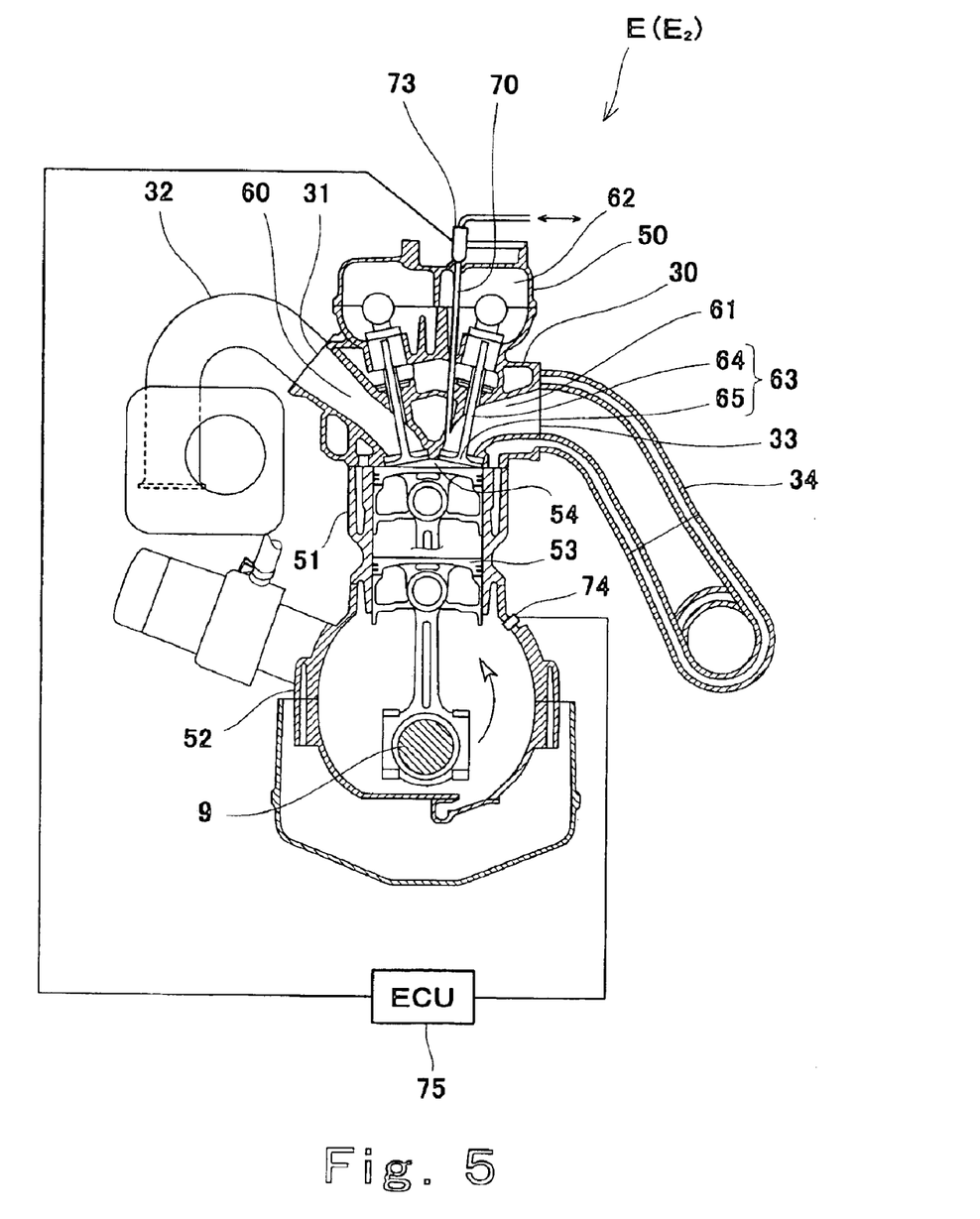
FIG. 5 is a cross-sectional view showing another construction of the engine mounted in the personal watercraft in FIG. 1.

The engine E having another construction will be described with reference to FIG. 5. An engine E ($E_2$) in FIG. 5 is provided with an electromagnetic valve 73 configured to be driven to open and close in accordance with an electric signal externally input, instead of the one-way valve 71 included in the engine $E_1$ in FIG. 4. A crank position sensor (hereinafter "CPS") 74 is provided in a crankcase 52 of the engine $E_2$ to detect a rotational angle of the crankshaft 9. The engine $E_2$ is mounted in the personal watercraft. An electric control unit (ECU) 75 is equipped in the personal watercraft and configured to control drive of the engine $E_2$. And, the electromagnetic valve 73 and the CPS 74 are each electrically connected to the ECU 75.

An operation of the engine $E_2$ constructed as described above will be described. While a signal from the ECU 75 is not input to the electromagnetic valve 73, the electromagnetic valve 73 maintains its closed state. The CPS 74 regularly detects the rotational angle of the crankshaft 9 and transmits the resulting signal to the ECU 75. Upon reception of the signal from the CPS 74, the ECU 75 judges an operating state of the engine $E_2$ based on the received signal.

When judging that the engine $E_2$ is in a stopping or stopped state, the ECU 75 outputs a signal indicative of this to the electromagnetic valve 73. Upon reception of the signal from the ECU75, the electromagnetic valve 73 opens. Thereby, the outside of the engine $E_2$ communicates with the exhaust port 61 through the air passage 70, thereby allowing a gas to flow between the outside of the engine $E_2$ and the exhaust port 61.

In the engine $E_2$ constructed as described above, when the engine $E_2$ stops and the exhaust port 61 has a negative pressure, ambient air is introduced through the air passage 70. Under this condition, the steam within the exhaust system 100 does not flow back toward the exhaust port 61. Also, even when the exhaust system 100 is closed and the steam is filled within the exhaust system 100, the exhaust port 61 communicates with the outside of the engine $E_2$ through the air passage 70 as soon as the engine $E_2$ stops, thereby allowing the steam filled within the exhaust system 100 to be discharged outside through the air passage 70.

In the construction of the engine $E_2$ in FIG. 5, the same reference numerals as those in the engine $E_1$ in FIG. 4 denote the same or corresponding parts, which will not be described in detail. The signal from the CPS 74 is used to judge whether or not the engine $E_2$ is in a stopping or stopped state, but this is only illustrative. Alternatively, this judgment may be made, based on whether or not an ignition plug of the engine $E_2$ has been ignited. As another alternative, the ECU 75 may be replaced by a driver configured to drive the electromagnetic valve 73 based on the signal from the CPS 74.

(Embodiment 3)

Figure 6:
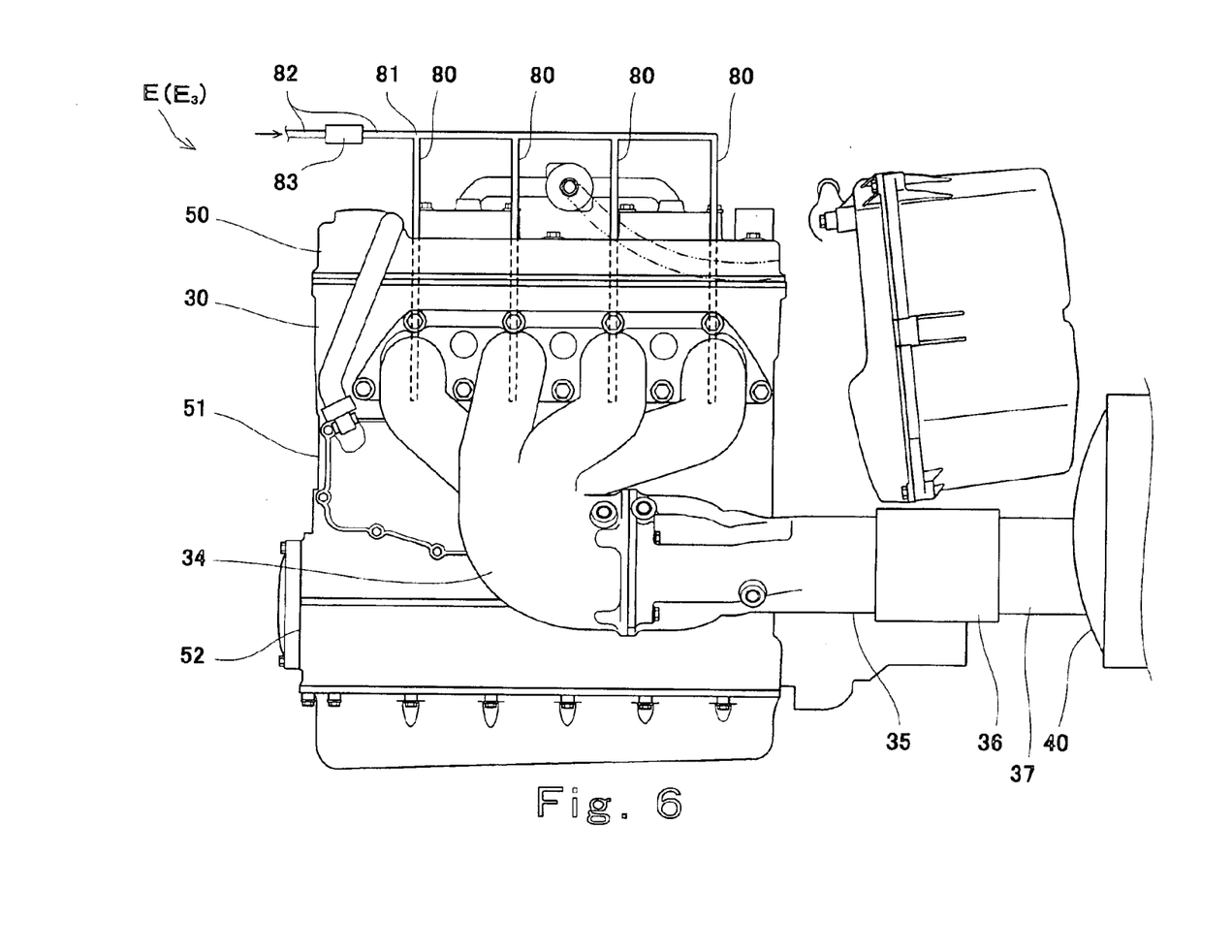
FIG. 6 is a side view showing another construction of the engine mounted in the personal watercraft in FIG. 1.

Another construction of the engine E will be described with reference to FIG. 6. An engine $E_3$ in FIG. 6 is provided with air passages (sub-passages) 80 as corresponding to the cylinders. As in the air passages 70 in FIGS. 4 and 5, one end of each of the air passages 80 are connected to the exhaust ports 61 and the other end thereof is placed outside of the engine $E_3$.

The engine $E_3$ in FIG. 6 differs from the engine $E_1$ in FIG. 4 in that the air passages 80 are merged at a location 81 to be formed into one air passage 82. A one-way valve 83 is provided in the air passage 82 so as to be closer to the other end of the air passage 82 (or outside of the engine $E_3$) than to the location 81.

The other construction of the engine $E_3$ in FIG. 6 is similar to that of the engine $E_1$ in FIG. 4 except the air passages 80 and 82 and the one-way valve 83, and will not be further described.

In the engine $E_3$ constructed above, it is not necessary to provide one-way valves so as to respectively correspond to the air passages 80. The valve (lead valve) 83 produces similar effects provided by the construction of the first embodiment and, therefore, the engine E3 is manufactured at a low cost.

The one-way valve 83 may be replaced by an electromagnetic valve. Also, other valves may be used. The electromagnetic valve may be configured to open and close based on the signal from the ECU as described in the second embodiment. In this configuration, the valve is driven to open and close properly according to an operational state of the engine E; for example, while the engine E is a stopped state.

While the engine $E_3$ is constructed such that all the air passages 80 corresponding to the four cylinders are merged, the air passages 80 corresponding to two or three cylinders may be merged.

As this invention may be embodied in several forms without departing from the spirit of essential characteristics thereof, the above embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An engine mounted in a watercraft and configured to discharge an exhaust gas through a water muffler, comprising:

a cylinder head forming a combustion chamber, wherein the cylinder head is provided with an exhaust port forming a part of an exhaust passage configured to draw the exhaust gas from the combustion chamber to the water muffler, and an air passage configured to branch from the exhaust port and to have one opening end communicating with an outside of the engine and an opposite end communicating with an inside of the exhaust port, and the air passage is provided with a valve configured to permit a flow of air within the air passage from the outside of the engine toward the inside of the exhaust port.

2. The engine according to claim 1, wherein the valve is configured to permit the flow of air from the outside of the engine toward the exhaust port when a pressure within the exhaust port is lower than a pressure of the outside of the engine, and is configured not to permit the flow of the air from the exhaust port toward the outside of the engine when the pressure within the exhaust port is higher than the pressure of the outside of the engine.

3. The engine according to claim 1, wherein the valve is configured to permit the flow of air within the air passage when the engine is in a stopping or stopped state.

4. An engine mounted in a watercraft and configured to discharge as exhaust gas through a water muffler, comprising:

a cylinder head forming a combustion chamber; and
    a sensor configured to detect an engine speed of the engine;
    wherein the cylinder head is provided with an exhaust port configured to draw the exhaust gas from the combustion chamber to the water muffler, and an air passage configured to allow the exhaust port and an outside of the engine to communicate with each other; and
    wherein the air passage is provided with a valve configured to restrict a flow of air within the passage, the valve being an electromagnetic valve configured to be driven based on a detection signal from the sensor and configured to permit the flow of the air within the air passage when the engine is in a stopping or stopped state.

5. The engine according to claim 1, wherein the air passage is configured to be connected to the exhaust port in the vicinity of an end of the exhaust port on the combustion chamber side.

6. The engine according to claim 1, wherein the cylinder head, the exhaust port, and the air passage are associated with one of a plurality of cylinders of the engine, wherein the air passage is divided into a plurality of sub-passages, each of the plurality of cylinders including the exhaust port, the air passage being configured to fluidically connect each exhaust port to the outside of the engine, through the corresponding sub-passage.

7. The engine according to claim 6, wherein the sub-passages are merged at a location thereof into a merged portion of the air passage, and the valve is provided so as to be closer to the outside of the engine than the location where the sub-passages are merged.

8. A personal watercraft comprising:

an engine mounted within a body of the watercraft; and
    an exhaust passage provided with a water muffler equipped within the body and configured to draw the exhaust gas from the engine to an outside of the body of the watercraft through the water muffler, wherein
    the engine includes a cylinder head forming a combustion chamber,
    the cylinder head is provided with an exhaust port forming a part of the exhaust passage configured to draw an exhaust gas from the combustion chamber to the water muffler and an air passage configured to branch from the exhaust port and to have one opening end communicating with the outside of the engine and an opposite end communicating with an inside of the exhaust port, and
    the air passage is provided with a valve configured to permit a flow of air within the air passage from the outside of the engine toward the inside of the exhaust port.

9. A personal watercraft comprising:

an engine mounted within a body of the watercraft, the engine including a cylinder head forming a combustion chamber, the cylinder head being provided with an exhaust port configured to draw an exhaust gas from the combustion chamber to an outside of the cylinder head and an air passage configured to allow the exhaust port and the outside of the engine to communicate with each other, the air passage being provided with a valve configured to restrict a flow of air within the air passage;

a water muffler equipped within the body and configured to be connected to the engine to allow the exhaust gas from the engine to flow within the water muffler;

a sensor configured to detect an engine speed of the engine; and a control device configured to receive a detection signal from the sensor and configured to, based on the received signal, transmit a signal indicative of whether or not the engine is in the stopping or stopped state, to the valve, wherein the valve is an electromagnetic valve configured to be driven based on the signal from the control device.

10. The personal watercraft according to claim 8, wherein the valve is configured to permit the flow of the air from the outside of the engine toward the exhaust port when a pressure within the exhaust port is lower than a pressure of the outside of the engine, and is configured not to permit the flow of the air from the exhaust port toward the outside of the engine when the pressure within the exhaust port is higher than the pressure of the outside of the engine.

11. An engine mounted in a watercraft and configured to discharge an exhaust gas through a water muffler, comprising:

a cylinder head forming a combustion chamber, wherein the cylinder head is provided with an exhaust port configured to draw the exhaust gas from the combustion chamber to the water muffler, and an air passage configured to allow the exhaust port and an outside of the engine to communicate with each other, the air passage is provided with a valve configured to restrict a flow of air within the air passage, and the valve is configured to permit the flow of air from the outside of the engine toward the exhaust port when a pressure within the exhaust port is lower than a pressure of the outside of the engine, and is configured not to permit the flow of the air from the exhaust port toward the outside of the engine when the pressure within the exhaust port is higher than the pressure of the outside of the engine.

12. The engine according to claim 11, wherein the valve is configured to permit the flow of air within the air passage when the engine is in a stopping or stopped state.

13. The engine according to claim 11, wherein the air passage is configured to be connected to the exhaust port in the vicinity of an end of the exhaust port on the combustion chamber side.

14. The engine according to claim 11, wherein the cylinder head is provided with a plurality of combustion chambers for a corresponding plurality of cylinders of the engine;

wherein the exhaust port is one of a plurality of exhaust ports, each exhaust port being associated with a respective one of the plurality of cylinders;

wherein the air passage is divided into a plurality of sub-passages, the air passage being configured to fluidically connect each exhaust Port to the outside of the engine, through a corresponding sub-passage.

15. The engine according to claim 14, wherein the sub-passages are merged at a location thereof into a merged portion of the air passage, and the valve is provided so as to be closer to the outside of the engine than the location where the sub-passages are merged.

* * * * *